United States Patent
Derksen (10) Patent No.: US 11,056,887 B2
(45) Date of Patent: Jul. 6, 2021

(54) DISTRIBUTED ENERGY CONVERSION SYSTEM

(71) Applicant: UNIVERSITAT DUISBURG-ESSEN, Essen (DE)

(72) Inventor: Christian Derksen, Essen (DE)

(73) Assignee: UNIVERSIT AET DUISBURG-ESSEN, Essen (DE)

( * ) Notice: Subject to any disclaimer, the term of this patent is extended or adjusted under 35 U.S.C. 154(b) by 192 days.

(21) Appl. No.: 15/737,029

(22) PCT Filed: Jun. 16, 2016

(86) PCT No.: PCT/EP2016/063834
§ 371 (c)(1),
(2) Date: Dec. 15, 2017

(87) PCT Pub. No.: WO2016/202903
PCT Pub. Date: Dec. 22, 2016

(65) Prior Publication Data
US 2018/0159332 A1 Jun. 7, 2018

(30) Foreign Application Priority Data
Jun. 16, 2015 (LU) .......................................... 92742

(51) Int. Cl.
*H02J 3/38* (2006.01)
*H02J 3/28* (2006.01)
(Continued)

(52) U.S. Cl.
CPC ................ *H02J 3/381* (2013.01); *H02J 3/14* (2013.01); *H02J 3/28* (2013.01); *H02J 3/32* (2013.01);
(Continued)

(58) Field of Classification Search
CPC ...... H02J 3/381; H02J 3/28; H02J 3/32; H02J 3/14; H02J 2003/143; H02J 2003/146;
(Continued)

(56) References Cited

U.S. PATENT DOCUMENTS

2013/0211612 A1   8/2013   Ahn et al.
2014/0012427 A1 *   1/2014   Katayama ......... H02J 13/00034
                                                    700/291
(Continued)

FOREIGN PATENT DOCUMENTS

DE   102012103081      10/2012
DE   102012103081 A1 * 10/2012 ............. G06Q 50/06
(Continued)

OTHER PUBLICATIONS

Translation of DE 102013222277 (Year: 2013).*
International Search Report prepared by the European Patent Office dated Sep. 6, 2016, for International Application No. PCT/EP2016/063834.
Search Report for Luxemburg Patent Application No. 92742, dated Jun. 16, 2015, 11 pages.

*Primary Examiner* — Rexford N Barnie
*Assistant Examiner* — Elim Ortiz
(74) *Attorney, Agent, or Firm* — Sheridan Ross P.C.

(57) ABSTRACT

A distributed energy conversion system is described. The illustrative distributed energy conversion system is described to include a first energy conversion entity and a second energy conversion entity being interconnected via an energy exchange network. The system is further disclosed to include an evaluation entity that is able to communicate with the energy conversion entities and create a roadmap for the consumption of energy by the first energy conversion entity and the second energy conversion entity.

11 Claims, 5 Drawing Sheets

(51) Int. Cl.
*H02J 3/14* (2006.01)
*H02J 3/32* (2006.01)
*H02J 3/00* (2006.01)

(52) U.S. Cl.
CPC ........... *H02J 3/003* (2020.01); *H02J 2310/14* (2020.01); *H02J 2310/64* (2020.01); *Y02B 70/30* (2013.01); *Y02B 70/3225* (2013.01); *Y04S 20/222* (2013.01); *Y04S 20/242* (2013.01)

(58) Field of Classification Search
CPC .............. H02J 2003/003; Y04S 20/242; Y04S 20/222; Y04S 20/224; Y02B 70/3266; Y02B 70/3225
See application file for complete search history.

(56) References Cited

U.S. PATENT DOCUMENTS

2014/0018971 A1 1/2014 Ellis et al.
2015/0112500 A1 4/2015 Koch

FOREIGN PATENT DOCUMENTS

| DE | 102013222277 | | 9/2014 | |
|---|---|---|---|---|
| DE | 102013222277 A1 | * | 9/2014 | ................ H02J 3/12 |
| EP | 2881911 | | 6/2015 | |

* cited by examiner

DISTRIBUTED ENERGY CONVERSION SYSTEM

CROSS REFERENCE TO RELATED APPLICATIONS

This application is a national stage application under 35 U.S.C. 371 and claims the benefit of PCT Application No. PCT/EP2016/063834 having an international filing date of 16 Jun. 2016, which designated the United States, which PCT application claimed the benefit of Luxemburg Patent Application No. 92742 filed 16 Jun. 2015, the disclosure of each of which are incorporated herein by reference.

BACKGROUND

The generation, distribution, and consumption of different energy carriers is known.

However, generation, distribution, and even consumption have come to be more and more complex.

For example, due to the increasing use of volatile energy generation plants (for power generation, for example), such as wind or photovoltaic systems, an over- or underproduction of electrical energy can occur that cannot be covered by the capacity or the storage capability of an electrical network. This problem is often referred to as a storage gap.

So-called SmartGrids are proposed in order to address this problem. In this context, most current smart grid applications and developments concentrate essentially on merely controlling the generation and consumption of electrical power.

In the technically superordinate area of electrical engineering, the main focus of control tasks is placed on frequency stability in order to ensure the stability of the networks, whereas at the level of the medium-voltage and distribution network, the focus is placed on maintaining voltage bands so that unwanted over- or undervoltage does not occur at the consumers, which might result in the damaging thereof.

In addition, there are generally economic aspects that provide for the management of energy generation and consumption (including storage) under market aspects, such as in the area of ancillary services, for example, or in the context of compliance with contractually established delivery or consumption quantities.

Other focal points that can constitute a basis for controlling energy conversion and storage systems are aspects such as the energy-efficient use of a system, the reduction of environmental impacts (e.g., $CO_2$ emissions), etc.

Current developments in the area of so-called smart grids focus on centralized control structures. These are control structures in which a series of spatially distributed systems are connected by a communication network in order for all necessary control decisions to be made from a central point for all of the systems involved.

This control approach tends to be oriented around planning, for example. Other alternative approaches involve more short-term or real-time control.

Conventional energy conversion systems are known from the prior art.

As a basic assumption, it can be assumed that all energy conversion systems are based on the first law of thermodynamics (law of conservation of energy). According to that, specific energy forms in technical systems are always only converted, and the balance of the quantities of energy fed into and discharged from the system is always 0.

While previous systems enable the local energy flow to be optimized, the superordinate or even distributed optimization of different forms of energy, energy sources, and energy sinks has not been possible—or not to a sufficient extent—with the previous approaches.

A demand-based load management system is known from US patent application US 2015/112500 A1.

However, load management is only inadequately suited to meeting the challenge of controlling diverse energy carriers in an efficient manner. The same also applies to generator control systems.

EP 2 881 911 A1 discloses another system in which control is made available on the basis of a static model. Specifically, user-induced function control is made available on the basis of user inputs.

The systems turns out to be inflexible, however, and only enables the network to be altered within narrow limits. Due to the user interventions that are required, the system proves to be inconvenient. What is more, the system turns out to be problematic particularly for dynamic changes in demand and/or supply, since it is based exclusively on cost.

The previous primary approaches have drawbacks which will be outlined briefly below. For instance, previous networks are highly fault-prone. In particular, the partial breakdown of data communication can result in a loss of control of the participating subsystems (single point of failure). What is more, as the size of the systems to be controlled increases, so does their complexity, which becomes very difficult or impossible to control. It should also be noted in this regard that the data traffic that is required is constantly on the rise, which also leads to increasing use of energy for communication and data processing in addition to capacity problems. Particularly in large systems, real-time control is no longer possible. In addition, the need for investments in the data transmission/data processing infrastructure is on the rise.

Current control approaches also lack basic, automatable adaptivity. This refers to the ability to dynamically place an energy conversion system under the control of a controlling unit (e.g., in the context of system aggregation in a distributed virtual power station) without the controlling system having to "know" the specific system to be integrated in advance. The reasons for this are that, as a general rule, control (exchange of information in relation to system states/measured values, transfer of default values to a system) is exercised on the basis of specific, perhaps application-related, and sometimes standardized protocols (e.g., Modbus RTU, Profibus, OPC UA, MBus, EEbus, IEC 61850, IEC 60870). In their form, some of the abovementioned protocols are focused only on the serial transmission of measured and default values. In both the transmitters and receivers of message packets, this requires coordination and configuration with respect to the sequence and format of the transmitted information. Others among the abovementioned protocols represent a standard for communication in specific areas of application, such as IEC 60870-5-104 ("Application-related standard for telecontrol tasks on IP networks"), which is used in the context of telecontrol technology in the area of infrastructure automation. Here as well, configuration is generally performed on an individual basis, so transmitters and receivers of messages must be coordinated with one another. In the standardized and even in the non-standardized case, a control task (e.g., optimization) can therefore only be carried out if the corresponding parameters are known at the controlling unit and translated appropriately. Moreover, the type of the system to be controlled and the possibilities for flexibilization inherently associated therewith in terms of the generation, consumption, and storage of energy must be known, so that they can be controlled in accordance with the set targets.

Current control approaches require non-negligible manual (and hence, in terms of the invention, nonadaptive) configuration work, which is generally static in relation to the system composition.

It is therefore the object of the invention to provide an improved distributed energy conversion system and components thereof which avoid one or more drawbacks of the prior art.

The object is achieved by a distributed energy conversion system according to claim 1. Advantageous embodiments of the invention are indicated in the subclaims.

In the following, the invention is explained in further detail with reference to the enclosed drawing on the basis of preferred embodiments.

Insofar as the word "a(n)" is used below in the description of the figures, it is intended as an indefinite article in each case and does not represent any limitation to exactly one object. That is, insofar as not explicitly indicated, "a(n)" always also includes the plural.

Where aspects of the invention are described in the following, they can be used reciprocally in the various embodiments insofar as not explicitly portrayed only as an alternative.

Where same reference symbols are used below for different objects, this is to be understood merely as an indication of the fact that a functionality can be provided in a different form.

Unlike known energy management systems, which must be provided with a large and cost-intensive system architecture and proportionately numerous subcomponents due to their centrally oriented control structures, the invention makes it possible to provide a compact, software-based, standardized, comprehensive, adaptive, and cost-effective system that is capable of initially controlling individual hybrid (multimodal) energy conversion processes while also carrying out individual optimization tasks.

On the basis of a general approach that is oriented toward performance and energy quantities, the invention can be employed both for electrical energy and for other energy carriers and forms. This makes it possible for flexibilization characteristics of energy conversion systems spanning multiple energy carriers to be exploited in order to satisfy and achieve the most varied of control requirements and objectives (whether technical, economic, or ecological).

Through a unified description of systems, the possibility of storing this description in the form of individual description files, and thus the ability to exchange them in an automated manner, a fundamental adaptivity is made available that makes it possible to combine the most varied of energy conversion processes and systems with one another without the need to integrate the technical energy capabilities of individual systems a priori into a (central) energy management system.

The invention also enables single or multiple systems to be inserted or removed dynamically in aggregations (for example, within a virtual power station or so-called "smart house" applications).

Through the uniform and consistent description of energy conversion systems by the invention, an approach to control is offered that makes it possible to render an energy conversion process completely self-descriptive. The options for variation and flexibilization that an energy conversion process offers can be reduced to similar parameters that are limited substantially to a systematic selection of operating states and the specific application of so-called target value variations. The system states resulting from this can be described with the aid of the invention both in an energetically qualitative manner and quantitatively as well. Based on that, and independently of the system to be controlled, superordinate optimization algorithms and approaches can be developed with the aid of evaluation or cost functions that can even be independent of the specific energy conversion process and system.

However, the invention also makes it possible to provide the observed individual systems or even aggregations of several individual systems with a new organizational affiliation. In other words, the invention enables energy-consuming systems on the one hand to be dynamically associated with a new supplier or energy-producing systems on the other hand to be dynamically integrated into a supplier's planning. Moreover, expedient network system characteristics can be rendered identifiable, so that available network-stabilizing services of systems can be potentially made available to the organizing unit of the network operation.

By means of the atomic or singular modeling and control approach that is made possible by the invention, the modeling and control approach can be used not only in the area of parallel systems, as is the case in the area of the electrical power supply, for example, in which control decisions are generally made in a temporally parallel manner, so that specific, time-dependent control objectives can be pursued (stability, energy efficiency, cost optimization, inter alia).

On the contrary, the invention also enables sequentially operated system constellations to be described and controlled. Such problems are encountered in industrial or process engineering contexts, as well as in the area of gas and heating networks, in which the state of upstream systems has a direct impact on the following systems.

By virtue of the possibility of carrying out various so-called evaluation strategies on site in a simultaneous and competitive manner for a single system, individual systems can already be made capable of operating in an "intelligent" and flexible manner toward diverse optimization requirements. The alternative roadmaps generated by the invention can be used by the software components used on site (by so-called energy agents, for example) for the purpose of selecting the best alternative for the situation from among the various possibilities.

At the same time, the knowledge and action model made available by the invention with respect to individual energy conversion processes and systems creates an artificial description that can also be used outside of real system environments. For instance, in the context of dynamic simulations, the invention makes it possible to make a corresponding model of a system available, so that the technical behavioral patterns can be reproduced or simulated in a realistic and adequate manner.

Furthermore, besides a comprehensive and atomically employable possibility for controlling individual systems, the invention likewise provides the possibility of describing complex system aggregations. Through a hierarchized and strictly consistent modeling of the participating systems (including the summarizing and superordinate system), an aggregation can be modeled as a true "system of systems." This includes the natural aggregation of an energy network—such as an electrical distribution network, for example.

All aspects, such as the energetically qualitative and quantitative evaluation of system states and the use of requirement-specific evaluation functions, are also made available by the invention analogously to individual systems. Several evaluation strategies can also be carried out in parallelized and competitive fashion, so that the best roadmap for the situation can be selected from among the resulting execution roadmaps.

What is more, the invention offers a basis for comparing central, hierarchical-decentralized, and completely decentralized control approaches. Through the modular structure of the invention, which is focused on individual systems, different control approaches can be implemented on the basis of consistent and reusable models, so that developed control approaches can be juxtaposed and compared. This type of usage is particularly suitable for simulations, but also for an application in real systems.

The invention thus also enables the systematic and long-term development of the most widely varied of control approaches to be pursued, which means cost savings, since systems that have already been modeled and their control approaches can be reused.

In addition, by virtue of its systemic approach and resulting nature, the invention can also be regarded as a decision support system. Starting from a specific system state, the invention indicates the possible consequences of a control decision (technical, quantitative and qualitative), so that decisions can be made on the basis of concrete numerical values and/or system states. In this regard, the invention can be applied both in the area of planning and in the area of real-time control.

The distributed energy conversion system will now be described in its most general form with reference to FIG. 1.

A distributed energy conversion system according to the invention has at least a first energy conversion entity $EWE_1$ and a second energy conversion entity $EWE_2$.

Firstly, attention is drawn to the fact that the concept of energy as used hereinafter for modeling includes any and all carriers—that is, electrical energy as well as chemically stored energy such as gas or oil, thermal energy such as geothermal and solar energy, district heating, etc.

What is more, the term "energy conversion entity" is used in a broad sense. In principle, it includes both energy consumers and energy suppliers. Typical energy consumers are "consumer elements" such as motors, for example, whereas typical energy suppliers are gas generators, power generators, and heat generators. Storage devices can therefore act both as energy suppliers in the discharge cycle and as energy consumers in the charge cycle. Without limiting generality, however, it can be assumed that at least one consumer and at least one supplier are present at a given point in time when there is an energy flow.

In other words, it is also possible with the invention to control different energy carriers in substitution for one another. That is, depending on the parameters/data, one specific energy carrier may be more expedient than another at one point in time. The system thus enables a new level of flexibility to be attained.

Another prerequisite of the invention is that the energy be exchangeable between the individual energy conversion entities via one or more energy exchange networks (EAN).

Although the invention can be used for different energy carriers and/or different energy exchange networks for same and different energy carriers, only the simplest case will be portrayed below for the time being.

In the energy conversion system according to the invention, at least one evaluation entity BE is additionally provided that can communicate with the energy conversion entities $EWE_1$, $EWE_2$.

The term "communication" is used here in its broad sense and can include both "internal communication," for example in the case of an integrated structure—more on this later—or very generally "external communication" with a physically separate unit as well. In that sense, the approach described here is based rather on the underlying logical model. Communication can take place over any suitable medium and is not bound to any one specific means of communication. In particular, however, a provision can be made that the individual energy conversion entities and the evaluation entity BE can communicate via the energy exchange network EAN, for example by means of technologies such as Powerline.

In the following, it is assumed that, at a first point in time, the first energy conversion entity $EWE_1$ is acting as an energy supply element and that the second energy conversion entity $EWE_2$ is acting as an energy consumption element. As was described previously, this can be different at another point in time; that is, at another point in time, the first energy conversion entity $EWE_1$ acts as an energy consumption element and the second energy conversion entity $EWE_2$ acts as an energy supply element.

For planning, data of the energy conversion entities $EWE_1$, $EWE_2$ are now transmitted to the evaluation entity. As a general rule, these data are transferred before the actual conversion of energy commences. Current data and/or prognostic data can also be transmitted, however.

In the following, it is assumed that the first energy conversion entity $EWE_1$ makes data concerning the provision of energy available to the evaluation entity BE in a step 100, with the data including one or more of the following: Availability period, available quantity, cost/unit of energy, amount of pollutant/unit of energy, and storage state for one or more future time periods.

The type and selection of the data that can be transmitted is of course dependent on the respective energy conversion entity and/or the carrier used on the energy exchange network. In a gas network, for example, the flow rate (e.g., $m^3/s$) or the flow variable heat value/time (e.g., kWh/s or kW) could be exchangeably transmitted provided that the state number and environmental parameters are known. For example, data concerning an availability period are exchanged, such as offer 30 kWh in a time period of 1 h with a maximum flow quantity of 500 W. In addition, it is of course also possible for additional data, such as values measured at the device, target values of the device, user inputs, etc., to be transmitted.

In the following, it is assumed that the second energy conversion entity $EWE_2$ makes data concerning the consumption and/or use and/or storage of energy available to the evaluation entity BE in a step 150, with the data including one or more of the following: Consumption period, consumed quantity, and storage state for one, two, or more future time periods.

Again, the type and selection of the data that can be transmitted is of course dependent on the respective energy conversion entity and/or the carrier used on the energy exchange network. In a gas network, for example, the flow rate (e.g., m$^3$/s) or the flow variable heat value/time (e.g., kWh/s or kW) could be exchangeably transmitted provided that the state number and environmental parameters are known. For example, data concerning consumption period can be exchanged, such as require 30 kWh in a time period of 1 h with a maximum flow quantity of 500 W. In addition, it is of course also possible for additional data, such as values measured at the device, user inputs, etc. to be transmitted.

Without limiting generality, certain data, such as characteristic curves, etc., can be stored in a storage device or database (not shown) and additionally received or queried by the evaluation entity with regard to an energy conversion entity.

After receipt of the data, which can of course arrive in any sequence or even in parallel at the evaluation entity BE, the evaluation entity BE can perform an evaluation of the data that have been made available in a step 200 in order to prepare a roadmap for the consumption of energy.

In a step 300 and/or in a step 350, this roadmap can then be made available simultaneously or successively to the participating energy conversion entities $EWE_1$, $EWE_2$.

The aforedescribed functionalities on the part of the evaluation entity BE and of the energy conversion entities $EWE_1$, $EWE_2$ can be embodied in software or hardware only, or in a combination of software and hardware.

The logical functionality of the energy conversion entities $EWE_1$, $EWE_2$ and of the evaluation entity BE can thus be carried out by energy agents that are contained in the respective "physical" devices, i.e., the energy conversion entities $EWE_1$, $EWE_2$, or are associated therewith. That is, where reference is made in the following to energy agents, an exemplary implementation of the associated logic is meant.

Influence can henceforth be exercised by means of the invention on the roadmap of the consumption and provision of energy; through the roadmap, influence is exercised on the system-immanent parameters of the purchasing and/or use and/or storage of energy—of the second energy conversion entity $EWE_2$, for example.

In other words, the energy conversion system being presented not only makes demand control possible, but also generator control in a fundamentally integrated manner. In doing so, the invention turns its back on previous systems, which have been based exclusively on demand control or exclusively on generator control, and enables much more efficient and multilayered control to be achieved not only of one energy carrier but of a multitude of energy carriers.

This will be explained briefly on the basis of the following example.

It is assumed that the first energy conversion entity $EWE_1$ is a current source, e.g., a wind turbine generator. It can supply a certain amount of energy with certain parameters in the period through sunset, for example, since experience dictates that other energy consumers (lamps, for example) then use up the energy. Beginning at midnight, however, the consumption of these consumers drops, so that the energy is again available for other ones.

The assumption is also made that the second energy conversion entity $EWE_2$ is a washing machine that is able to extend the individual washing steps so as to be distributed over time: for example, a first washing cycle at a temperature X corresponding to a first power consumption over a first time period $Z_1$, followed by a spin cycle corresponding to a second power consumption over a second time period $Z_2$, and then followed by a rinse cycle corresponding to a third power consumption over a third time period $Z_3$.

With knowledge of these data, the evaluation entity BE can now prepare a roadmap—for example, the time period $Z_1$ is to start at timepoint $ZP_1$, so that the time period $Z_1$ begins in due time before sunset. After midnight, the spin cycle (second time period $Z_2$) can begin. This roadmap can be made available both to the washing machine $EWE_2$ and to the wind turbine generator $EWE_1$.

In another example, let us assume that a clothes dryer can be operated both with current and with residual heat of a thermal solar system.

Now a decision can be made as to which energy carrier to use between the current supply and the gas supply, depending on the (expected) thermal supply, for example. For instance, at the beginning of a drying cycle, there may be a strong wind, so that a large amount of current is available, after which a high level of solar radiation results in a commensurately high supply of thermal power. The respective energy carrier and the respective usage periods can now be determined as a function of the supply and of the expected demand.

It should be noted that the type of energy conversion can vary greatly. In principle, the type of energy conversion can be categorized by the following (non-exhaustive) characteristics:

| Energy consumption, generation or storage | Examples |
| --- | --- |
| Constantly working | Light bulbs, devices in standby mode, batteries, special types of (small) power stations |
| Task-dependent | White goods (such as washing machines, dishwashers, etc.), industrial operations (e.g., during startup and shutdown processes), etc. |
| Environment-dependent | Wind power and photovoltaic systems |
| Repetitive | Refrigerators, central heaters, mCHP systems |
| Dynamically controllable | Storage power stations, gas power stations, gas turbines, compressors, gas storage tanks, etc. |

It should also be noted that technical systems may not be limited to to using or generating energy in only one way. Rather, depending on the operating state of a system, several types of energy use may already occur in a single system. Accordingly, it is essential that possible operating states be differentiated.

Energy flows can depend on external circumstances or specific system settings. This is true of environment-dependent systems such as wind power or photovoltaic systems, for example, which generate energy as a function of the current weather and the position of the sun. But this also applies to dynamically controllable systems that generate or consume energy as a function of corresponding setpoint values. Another object of the invention is therefore to transform the individual, system-specific parameters of technical systems to a uniform database in order to enable energy flows resulting from it to be determined. As mentioned previously, time-dependent energy flows and the resulting energy quantities form a suitable foundation for this purpose, although they must be differentiated and evaluated based on the type of energy carrier used, such as electricity or gas, for example. What is crucial here is that the resulting model be capable of representing the behavior over time and hence the inherent dynamics of the technical systems.

Figure 1:
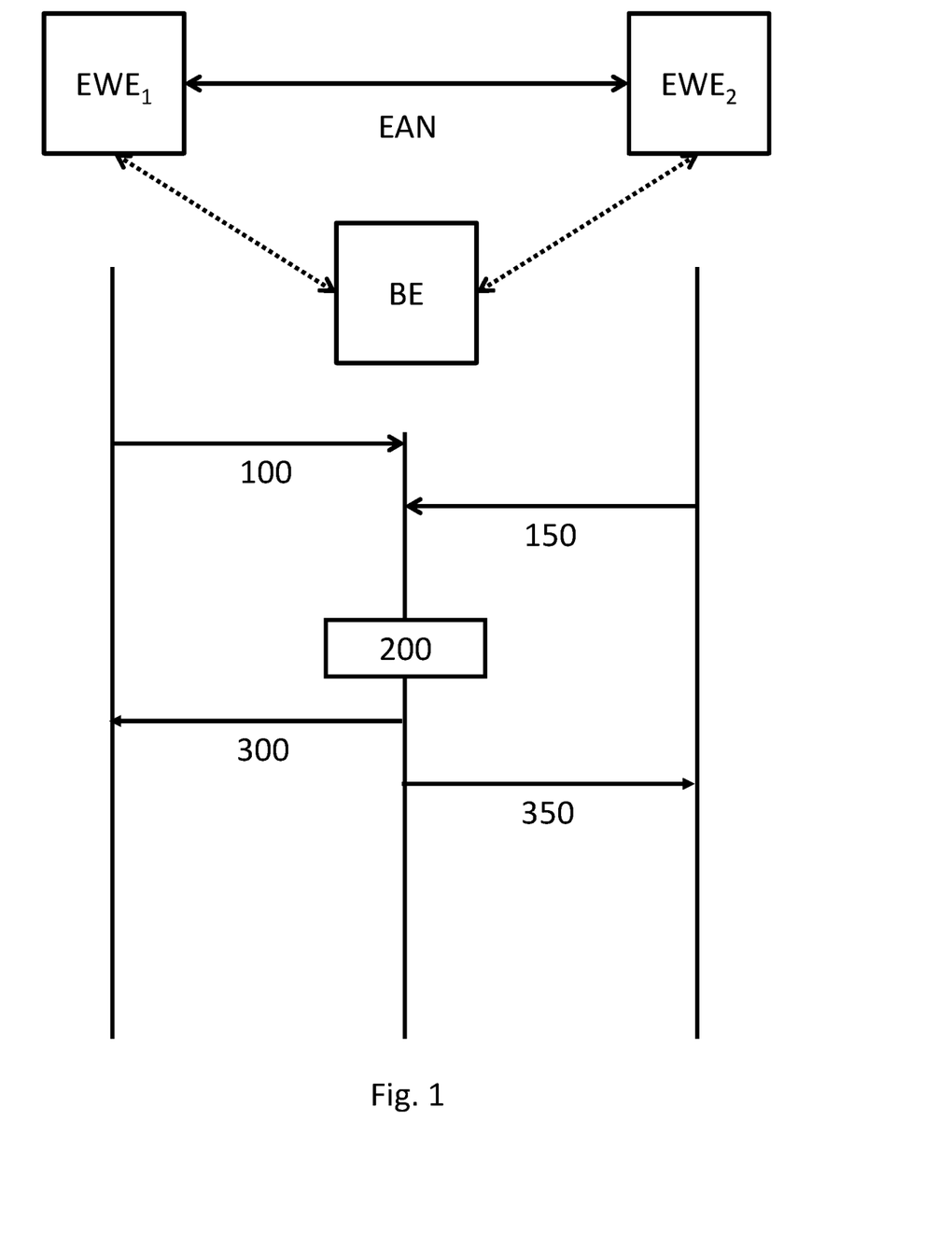
FIG. 1 shows a schematic representation of embodiments of the invention in addition to a typical communication flow.
Figure 2:
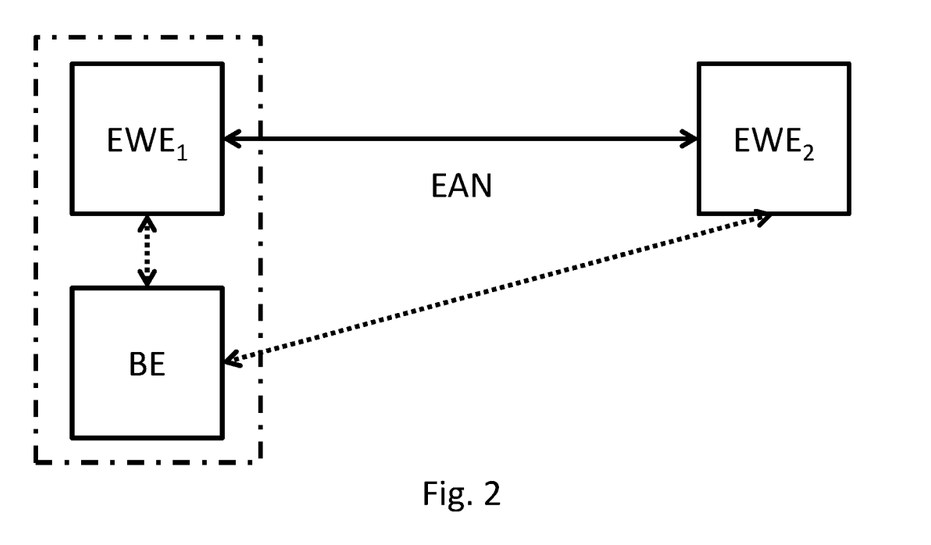
FIG. 2 shows an additional schematic representation of embodiments of the invention.

This logical model can now also be implemented by having the evaluation entity BE, as shown logically in FIG. 1, also be physically separated from the energy conversion entities $EWE_1$, $EWE_2$. For example, the evaluation entity can be in its own control center of a building or machine control, or it can also be part of so-called smart devices or apparatuses, such as a smart meter, for example. In this respect, the evaluation entity BE can be integrated into the energy conversion entity $EWE_1$, as shown in FIG. 2. The exchanging of data between the logical energy conversion entity $EWE_1$—that is, between the energy agents of the energy conversion entity $EWE_1$ and the evaluation entity BE—can take place via an (internal) communications interface.

However, the evaluation entity BE can also be a component of the first energy conversion entity $EWE_1$ and/or a component of the second energy conversion entity $EWE_2$; after all, the logical model does not require any clear localization of an evaluation entity. What is more, it should also readily be understood that an energy conversion entity $EWE_1$, $EWE_2$ can certainly also be connected to a plurality of evaluation entities BE and also exchange data with a plurality of evaluation entities BE.

Figure 3:
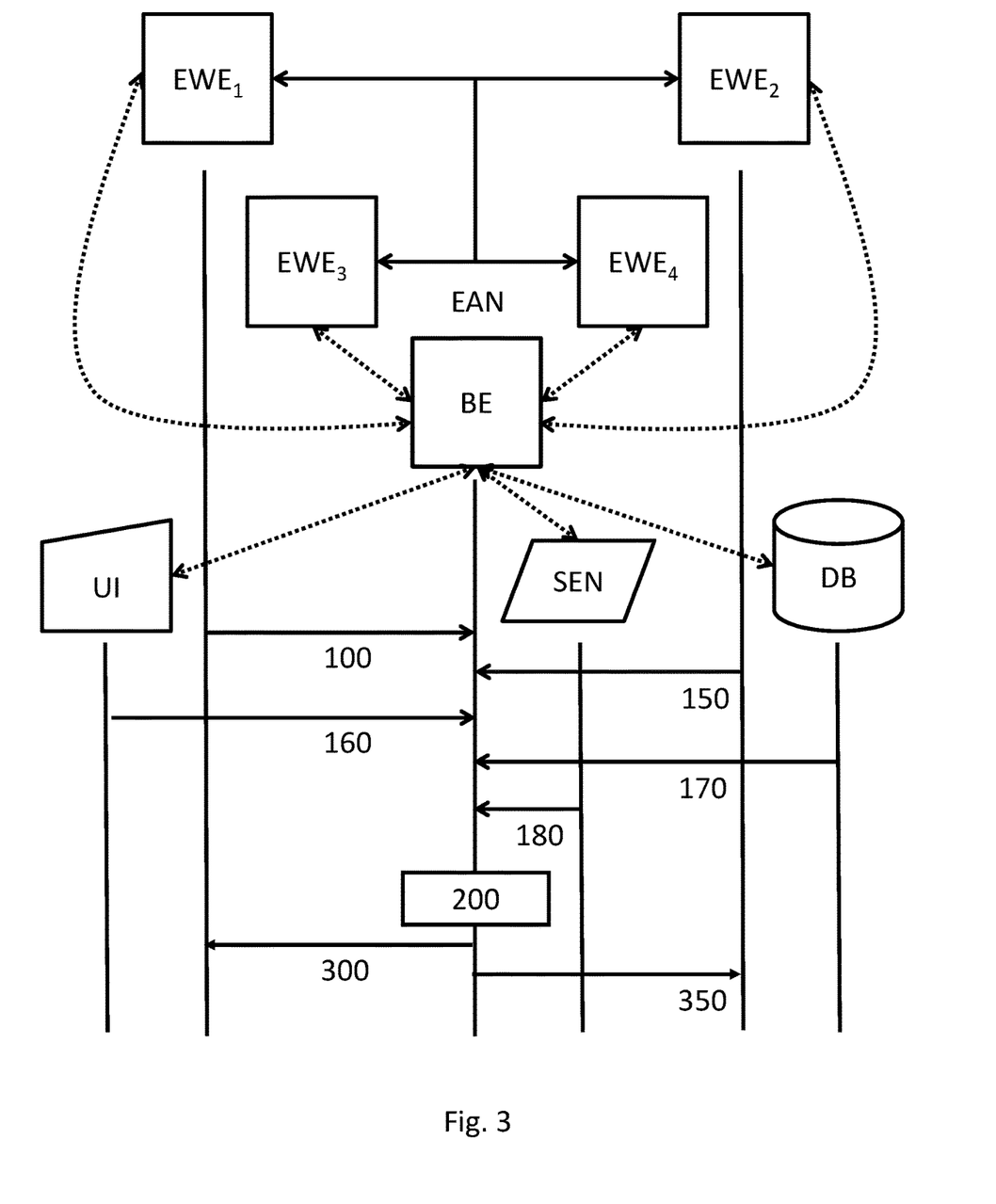
FIG. 3 shows a second additional schematic representation of embodiments of the invention.

Without limiting generality, a plurality of evaluation entities can also be provided on an energy exchange network EAN. In addition, as shown in FIG. 3, the energy exchange network EAN can also be wider-ranging and have more than the previously described energy conversion entity $EWE_1$, $EWE_2$, with the indication of energy conversion entity $EWE_3$, $EWE_4$ being merely for the sake of example.

Depending on the design of the energy conversion entities $EWE_1$, $EWE_2$, a provision can also be made that alternatives, i.e., alternative (execution) roadmaps, can be made available by the evaluation entity. In that case, it can be expedient for the respective energy conversion entity $EWE_1$, $EWE_2$ to decide on the basis of other criteria whether it selects one or none of the alternatives. This decision can be subsequently communicated to the evaluation entities BE.

Independently of the type of system in question, data or information sources can be differentiated as follows for further processing or to control a system for the invention:

Internal Static Information

With this category, individual pieces of information or data models can be identified which are relevant exclusively for single systems or for one type of system. As a simple example, the program-dependent consumption data of individual washing machines or of a dryer might belong to this category, for example. Other, much more complex data models are also certainly conceivable, however, such as characteristic maps and other sets of parameters that describe systems like generator steam turbines, compressors, or combustion engines, for example. The commonality in terms of information technology lies in the fact that the basic information about a technical system required for further calculation can be identified by static models.

Flexibility Information

This type can include the information that can be influenced through an external intervention in the technical system and thus alter the energy flows at the boundaries of the system. In practical application, this can be the target values of the system control, which can be changed automatically by an external control unit (such as the energy agent, for example) and with the aid of appropriate communication protocols. Unlike the next group of end user data, this type generally cannot allow any changes by an end user.

End User Variability

In this group, the information can be summarized that can be changed or prescribed by an end user. This can be a desired room temperature or a preset room temperature profile for a day, for example. Unlike the flexibility information described above, the information in this group cannot be changed initially by automated control processes.

Environmental Information

Many technical systems such as wind power and photovoltaic systems, for example, depend on the current weather situation and thus on their environment. This information may not be detectable by the sensor system of the technical system itself in some circumstances, however, so it can be necessary to consult external data sources and services in order to use the information system-internally.

System State Information

This group can primarily include system-specific sensor information and thus the measured values that are available to a technical system. Moreover, this group can include the current target values of the system control and, insofar as such a dependence exists, corresponding environmental information. Typically, read-only access to the information providers and sources occurs in order to gather this information.

In particular, a provision can be made in a development of the invention that topological data and/or system states of the energy exchange network EAN are also made available to the evaluation entity BE, in which case the topological data and/or system states are also taken into account in the evaluation. This topological data can be made available either externally (push) and/or called up from a database DB and/or through other services such as a web service, for example (pull)—as indicated in FIG. 3.

This is especially valuable when line capacities are limited, for example, so that while several sources could feed power in or sinks could consume power in principle, the capacity of the energy exchange network fluctuates strongly, for example.

In addition, it can also be ensured in this way that the frequency is kept stable within preset parameters on an alternating-current network.

However, this is also especially valuable if energy sinks $EWE_1$, $EWE_2$ or energy sources $EWE_1$, $EWE_2$ are locally variable in relation to the energy exchange network EAN. For example, the use of the storages of electric vehicles as intermediate storage is something that is being widely discussed at present.

Figure 4:
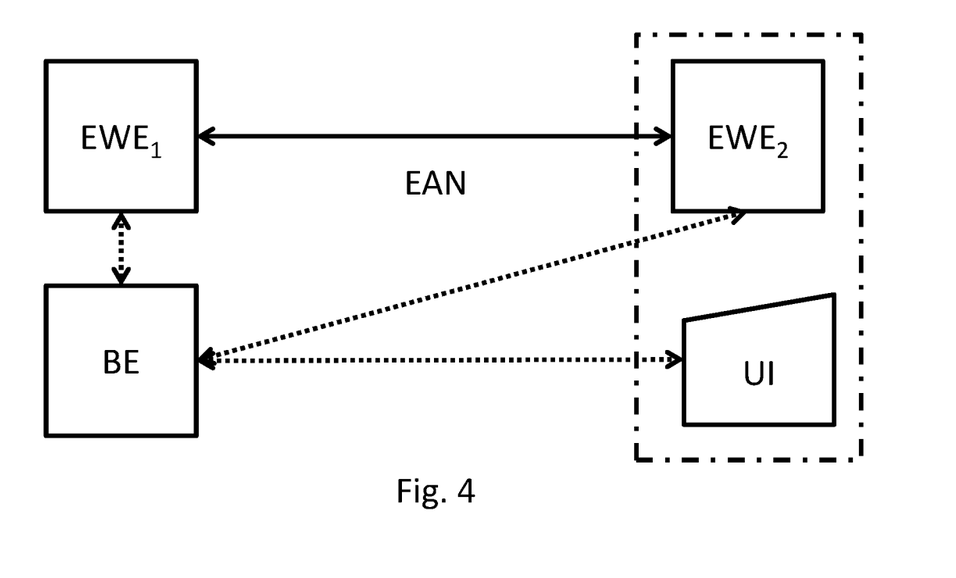
FIG. 4 shows a third additional schematic representation of embodiments of the invention.

In addition, a provision can be made that a user of an energy conversion entity can input data in relation to this energy conversion entity $EWE_1$, $EWE_2$. In this context, "input" means that the user himself specifies the data—for example, a desired target temperature, a desired duration, etc. "Input" includes all manners of inputting, such as direct inputting at one or another energy conversion entity $EWE_1$, $EWE_2$, direct inputting at the evaluation entity BE, or inputting via a remote application such as a telephone app or a web service, for example. Such inputting can be achieved by means of a user interface UI in a step 160, as indicated in FIG. 3, for example. These data can then be taken into account during the evaluation in like manner. However, the user interface UI can also be a component of an energy conversion entity; in FIG. 4, it is a component of energy conversion entity $EWE_1$.

Reference has already been made to the possibility of exercising influence by means of sensor data. In that vein, a provision can also be made that environmental data BE are either made available externally to the evaluation entity in a step 180 (push) and/or retrieved by one or more sensors SEN (pull), as indicated in FIG. 3.

In addition, a provision can be made that prognostic data are either made available externally to the evaluation entity BE in a step 170 (push) and/or retrieved from one or more databases DB (pull), as indicated in FIG. 3.

Prognostic data are generally forward-looking information on system variables that have already been defined. For the sake of example, the invention offers two possibilities for individual system variables in order to make prognostic data available for the evaluation. Static prognostic measurement series can be stored, for one. Alternatively or in addition, however, a provision can also be made that the prognostic data are determined mathematically or are retrieved from an external service provider such as a weather service, for example.

Although the efficiency of the energy distribution has stood in the foreground up to now, a provision can also be made that, for control purposes and/or accounting purposes, user data or identification data of an energy conversion entity $EWE_1$, $EWE_2$ are also exchanged. The functionality for the accounting of energy flows can also be realized in this way, for example, with the term "accounting" being understood in its broad sense and including emissions values or the like, for example. The evaluation entity BE can thus also easily have the goal of optimizing costs in terms of accounting.

If "costs" in general are selected to determine the operational optimum, the cost unit must first be defined with the aid of which these costs are to be grouped together. Monetary units can be considered in this respect. Other cost units that are equally capable of describing the operational utilization of a system are also conceivable, however. For example, the amounts of carbon dioxide ($CO_2$) produced or saved are applicable, which, with appropriately formulated cost functions, could be utilized for the purpose of commensurately evaluating the energy quantities of a technical system. Cost and conversion units can thus be indicated in "euros per kWh" or in "tons of $CO_2$ per MWh." Depending on the cost unit that is chosen and statements regarding the first law of thermodynamics, the energy quantities that are converted by a technical system over time can thus form the basis for the operational evaluation thereof. Depending on the energy carrier used and the system-related direction of flow, however, different—and, in part, time-dependent—cost functions are applicable here. Some examples that are worthy of mention here are demand-response approaches, differing rates of remuneration for the removal or supply of electrical energy of a prosumer, or the connecting of a technical system to different networks.

In addition to an evaluation that focuses on energy carriers and quantities, however, additional relationships may also be relevant to the operational optimization of a technical system. It is conceivable, for example, for installation or maintenance costs as well as depreciations to also enter into the evaluations, or that operating states such as stoppage and startup and shutdown processes must be specifically evaluated. The costs or yields resulting from this must therefore be taken into account with the energy quantity-related costs.

Despite the resulting high and sometimes strongly varying requirements that are placed on cost modeling for the operational evaluation of technical systems, it is an aim of the structure offered by the invention to provide the greatest possible flexibility in order to support the use of different evaluative approaches. Accordingly, the system for calculating the costs or yields for an operating state defined by the model of the invention is aimed at combining together and summing up the subtotals of various calculation steps and processes. A state description of a technical system that covers the energy carrier-dependent energy flows at the network connections of a technical system for a defined period of time can serve as the basis for this. Individually defined cost functions that are differentiated by incoming and outgoing useful energy and by type of energy carrier can be used to assess the cost of the energy conversion into an operating state. The sum of the expenditures or yields in relation to the energy flows can represent the first aspect of the operational evaluation of individual, time-limited operating and system states.

A provision can also be readily made in the system of the invention that user data in relation to the second energy conversion entity $EWE_2$ are made available to the evaluation entity BE, with the data including user specifications for one or more future time periods. For example, this enables a user to indicate that a certain process be completed by a certain date and time—such as an automobile or laptop battery being charged by tomorrow morning at 6:00.

A provision can also be readily made in the system of the invention that user data in relation to the first energy conversion entity $EWE_1$ are made available to the evaluation entity BE, with the data including user specifications for one or more future time periods. Maintenance intervals can be communicated in this way, for example.

In addition, a provision can be made that prognostic data pertaining to at least one of the energy conversion entities $EWE_1$, $EWE_2$ are made available to the evaluation entity BE, with the data including one or more of the following: Energy production and use, storage volume and state for one or more future time periods.

The objectives of controlling a distributed energy conversion system or one or more individual energy conversion systems can vary. For instance, both the time spans observed and the evaluation criteria for the energy quantities converted can differ. With the inventive approach presented herein, it is possible both to make short-term decisions—for the "quick" stabilization of a local network in the range of seconds and minutes—and to conduct medium- and longer-term planning that extends over a period of several hours or days. In principle, the model can support the pursuit of different objectives. Depending on these objectives, certain information can be advantageous which can be utilized in the framework of a state space evaluation. This specific information will be identified and briefly explained below according to the objectives made possible by the invention:

Short-Term Stabilization of System Connections

In order to be able to respond technically to short-term events and, in doing so, adapt the energy flows of a system, ideally only the information that has already been gathered is required. Depending on the current system state, which also includes the current energy flows, and the possibilities for flexibilization that are described by the basic model, alternative roadmaps for execution can be prepared on the spot as necessary. In the case of environment-dependent systems, however, additional prognostic information that enables the energy production of photovoltaic and wind turbine generators to be predicted may be advantageous. However, the same also applies to target values that can be specified by the user of a system, such as a daily temperature profile for a heating system. This offers the advantage of the provision of prognoses whenever (defined) measured values or user specifications are used in the model as output and calculation parameters for determining energy flows; accordingly, these prognoses can be available in preparation for evaluations for the time period observed.

Energy Efficiency

If a technical system is planned with the aim of achieving an objective with minimum energy input, the invention offers the information about the input and output required for this purpose, the basic model, and the ability to describe the state of a technical system over time. With the aid of the cumulative energy inputs, the energy quantity transported at an interface and over time can be updated. In addition to this, however, the energy loss that follows from the current efficiency of a system can also be of interest. In this respect, the invention offers the ability to also sum up these values over time over the course of the evaluation process. Analogously to the preceding remarks on the short-term stabilization of system connections, prognoses of measured and setpoint values can also be advantageous for these optimization objectives.

Cost Optimization

This optimization objective also first requires contemplation of the current operating state and a determination of the energy quantities accumulated over time. To put it in general terms, however, cost-oriented optimization also requires the defining of a suitable cost model that summarizes the energy quantities consumed or generated over time with the aid of suitable cost functions under a common cost unit. Analogously to prognostic values, this information can also be available for the observed optimization period and can also change over the course of time.

It remains to be noted that the evaluation unit BE can also pursue more than one goal, in which case the goals can be weighted as a function of user specifications or other parameters.

Step-by-Step Basic System for Evaluating Technical Systems

Depending on the system being described, different operating states and the variations of target values contained therein can have the effect of setting a plurality of different system states for a point in time.

If one considers the evaluation process in step 200 as being a temporally forward-oriented, systematic search for an optimized roadmap, the widest variety of states of a technical system can be identified with the aid of the time steps described by the operating states.

For better differentiation, a total of five levels can be distinguished here which can be applied within an evaluation strategy.

It should be noted that the following evaluation process 200 is described merely for the sake of example, and that variations and alterations are readily possible.

The first level represents a basic model that can include all of the system-describing parameters. These can include the abovementioned internal and external information sources as well as connection configurations, network connections, the energy carriers involved, operating states, operating state transitions, and energy carrier-dependent energy flow, etc. All of the other levels make use of the information made available here. The second level offers answers in relation to the possible flexibility of a technical energy conversion process. Depending on the momentary state of a system, the question can thus be answered as to which system states could, by definition, be set as subsequent states. With the third level, the systematics can make a search graph available which enables depiction of the already-determined state space and, thus, recycling of the ascertained energy flows and costs corresponding thereto. The fourth level offers support in relation to time restrictions and possible storage states, so that the final, fifth level can represent the resulting completed roadmaps. The levels, which have been described only briefly here, will now be described in greater detail in the following.

2nd Level—State Variability

On the basis of the basic model and the defined input and output information, the question as to what flexibility a technical system makes available and how it can be utilized in the framework of an automated evaluation can be reduced essentially to two aspects. One of these aspects is a possible change in the operating state, which is described by means of the corresponding graphs of the basic model. The other is that the specified or target values for the system control can be changeable in an operating state, so that additional state changes can be brought about by that route. In summary, these two aspects can be referred to here as "state variability."

The description of this variability can be contemplated at this point of the basic system independently of the specific point in time in which the system is being observed but also independently of time restrictions or maximum possible storage states. Since the question regarding what possible states a system can assume in the next time step can arise over and over again over the entire evaluation period, a corresponding graph can be prepared right at the beginning of an evaluation that can be retrieved over the course of the evaluation process and according to the current system state. The directed graph for the state variability can be described as follows:

$G_{ZV}=(V, E)$ describes a directed graph for the state variability of a technical system, with the vertices V describing the finite quantity of all operating and target value-dependent states of a system, and with E, the edges of the graph, describing the finite quantity of all possible transitions between these states. To construct this graph, the initial state of the system defined for the evaluation is first utilized in order to create the first vertex of the graph. With the aid of the operating state transitions defined in a basic model, possible subsequent states are then identified. It is important to note that a variation in target values can result in a multiplication of the possible subsequent states. The possible subsequent values for individual target values can be easily determined by starting from a current target value, the discretization defined for this system variable, and the gradient established for it. In the combination of several target values, the total quantity of possible subsequent states follows from the cross product of all individual target value variations. Once the subsequent states for a state have been identified, corresponding vertices are set up for them. Later, this procedure can be applied recursively to one or more subsequent states until the associated variations in the operating state and target values of the technical system have been identified and reflected. In order to recognize vertices that have already been identified, a simple hashing method can be applied which uses the current operating state and the current target values as its basis. The resulting set of vertices depends very much on the system being observed but does not pose any substantial challenges in terms of taxing storage capacities or performance. However, it can save the repeated instantiation and execution of the procedure described herein for determining subsequent states at the next level of the basic system.

3rd Level—State Space of a System

In the further course of the evaluation, system sequences could now be selected analogously to the described procedure and the overall system flow perpetuated accordingly. The drawback of this approach, however, is that a decision that is made exclusively on the basis of the possible operating state and the possible target values does not contain any information about the consequences of this decision. Purposeful decisions are therefore very difficult or impossible to make at this juncture and ultimately require a very time-consuming search for a suitable and/or optimized roadmap for a technical system. Particularly in cases in which the calculation processes are complex for a system and a high degree of flexibility exists, the short-term search for a suitable alternative execution plan will very likely not enable the time requirements to be satisfied.

The approach developed in order to resolve this problem is addressed by the 3rd level of the basic system that is described here. The basis for this is the previously-described unambiguous identification of the state of a technical system. This can be used at this level to construct a difference graph that describes the possible states of a technical system over time. The vertices of this graph can contain the chronological system states with all input and output values as well as the energy flows that are pending at this point in time at the network connections of the technical system.

If the temporal behavior of a technical system is to be described on the basis of the model of the invention, the starting or initial state may first need to be identified. In a real system, this can be achieved by identifying current measured values and energy flows, for example. In the context of the invention, this is generally predetermined by the settings made in preparation for the evaluation. Once the defined initial state is in hand, a temporally accurate and complete description of all state values is available. These can include (all) input and output information (including updated prognostic values), all energy flows pending at the connections at the specific point in time, and, if available, the storage states of the energy stores that exist in the system. At this point in time, the cumulative energy quantities, resulting costs, and energy flows are 0.

Figure 7:
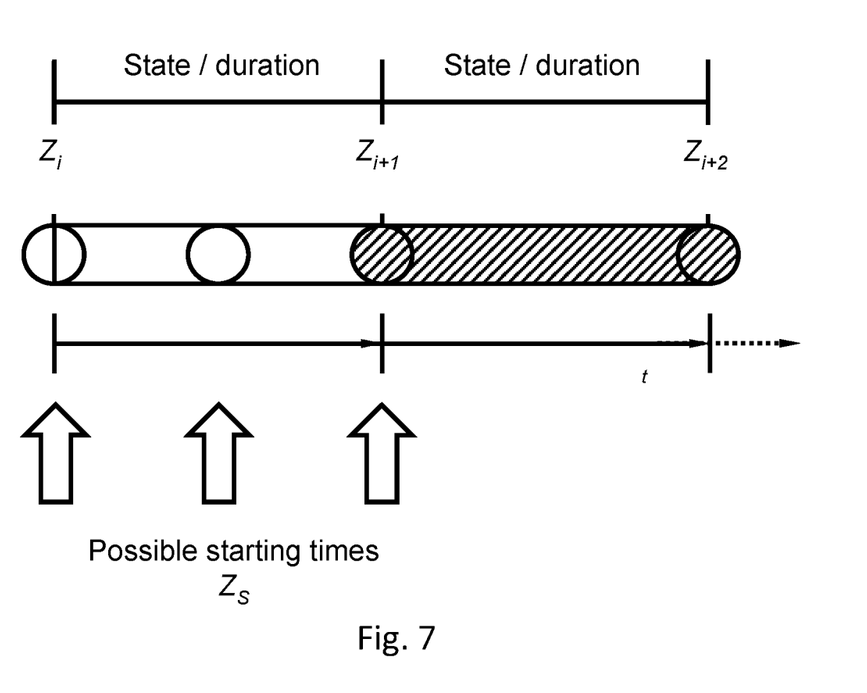
FIG. 7 shows correlations between states and subsequent states according to one embodiment of the invention.

Starting from an initial state, a decision that establishes the next system state can then be made. The aforedescribed graph on state variability, which describes the flexibility and thus the possible decisions, is available for this purpose. If the decision is made arbitrarily at the outset, then the next operating state and the specific target values for the next system state are now set, but not the resulting state values for energy flows or costs. Accordingly, the required information must be additionally ascertained in order to determine the resulting energy flows and the energy quantities corresponding thereto. Based on that, an assessment of the subsequent state can then be made on the basis of appropriate cost functions and/or on the basis of energy losses. This can include one or more of the following steps, for example:

Identification/updating of system variables (including prognoses)
Determination of the energy flows at technical system connection points and determination of energy losses
Determination of the energy carrier-specific energy quantities for the time of the operating state
Updating of the cost functions
Determination/summation of the energy carrier-specific and state costs
Summation of energy quantities, losses, and costs in relation to the previous state The model of the invention can also simultaneously describe the time period for an operating state for which it is defined, for example. Accordingly, the specific starting timepoint for an initial state $Z_s$ can lie either right at the beginning, in the middle, or at the end of a defined operating state; see FIG. 7. In all cases, however, the situation must first be determined that arises at timepoint $Z_{i+1}$ from the defined (initial) state; $Z_s=Z_{i+1}$ can represent an exception in this case. If the (initial) state comes before the end of a defined operating state, the determination is initially performed analogously to the abovementioned steps, but in a commensurately abbreviated time period. The resulting state $Z_{i+1}$ thus represents the first state in which a decision can be made regarding the flexibility of a system.

The task of the edges of the graph is to describe the changes that are produced as a result of a selected subsequent state. Based on the duration and the energy flows of an operating state (including losses), these changes can initially include the energy quantities that are transferred via the individual network connections of the technical system. They can also include the resulting energy carrier-dependent costs or yields. Based on that, it is possible to subsequently identify the balanced resulting energy conversion and the change with respect to the total costs corresponding thereto. The calculation steps taken here correspond substantially to the procedure for determining the total costs that was presented in the context of the cost model, but depending on the model assumptions, they can apply only to a selected operating state and one variant of the possible combinations of target values. Moreover, the information about the converted energy flows and quantities can be kept for reuse.

In principle, the difference graph need not be prepared in the context of an evaluation process. Instead, it can be used when the basic system of the energy option model described here is applied, for example. In that case, however, the graph is not prepared directly and completely over the entire evaluation period, but rather only where a search process happens to be located at the moment. Starting from a previous state, the graph of state variability can first be used to identify all possible changes for operating state and target values. Based on that, all of the changes corresponding thereto as well as the resulting subsequent states can then be identified. There is no need to extend the graph behind vertices or system states not visited.

To summarize the aim of the third level, its main task consists in identifying all achievable subsequent states on the basis of a current system state and based on the flexibility inherent to the system. The changes that occur in the system as a result with respect to energy quantities and corresponding costs can thus be quantified. The difference graph can already take specific system states into account, but it focuses only on the energy flows at the boundaries of a technical system. This is a result of the approach taken to unambiguously identify a system state, which also renders the vertices identifiable in the difference graph. To this end, the system parameters can be specified which have a direct or indirect influence on the energy flows at the boundaries of a technical system. The storage states of a technical system only need to already be taken into consideration here in special cases; one example of such a system is a gas storage device, since the energy flows occurring at the inlet and outlet of the device depend on the internal pressure and thus on the amount of energy that is already located in the device.

4th Level—Limit Values and Observance of Time Restrictions

As mentioned above in relation to the difference graph, the specific storage states of a technical system have not yet been taken into consideration. Nor have the time restrictions that are defined for individual operating states with minimum and maximum dwell time been considered up to this point. Furthermore, the control values controlled by the controller of a system must also be maintained within the predefined limits.

Taking these aspects into account is the task of the fourth level presented here, which filters the subsequent states identified on the third level and can then forward them to the outcome layer.

Starting from a current system state—which, however, contains a realistic storage state at this point—it can be checked on the basis of the outgoing edges of the difference graph how large possible changes can be in relation to the fill levels of a store. If the state that results from a change is less than 0 or greater than the indicated storage capacity, this subsequent state is excluded from further consideration.

Monitoring and filtering for the purpose of adhering to the minimum and maximum time restrictions for an operating state may require the preceding operating states to be taken into account. The rule for the minimum duration is that an operating state may only be left once the defined minimum dwell time has been exceeded. Accordingly, the decision as to which subsequent state may be assumed at a specific point in time can be dependent on this. If the defined minimum time in the series of previous states has not yet been reached, this reduces the list of possible next operating states accordingly. Analogously, for the maximum duration, an operating state may only be left once the maximum time period for an operating state has been exceeded. Here, too, a backwards-oriented search process can be used to check this restriction and reduce the list of possible subsequent states as needed.

The last aspect that can be checked on the 4th level are the boundary values of specific measured values predefined by the control of the technical system. If a calculated new measured value over- or undershoots the predefined control range, the new system state resulting from the changes can be filtered out.

These remarks concerning storage state and time restrictions may seem abstract, but they become clearer as soon as the overall process of the basic step-by-step system is observed. All levels are utilized in order to create a single roadmap, thus enabling the outcome level that is described in the following to be constructed.

5th Level—Outcome and Roadmap Level

The outcome of an evaluation and hence the roadmap for a technical system is represented in the model by the state that was determined for the end of the evaluation period. The preceding system states can be stored recursively. In the context of a forward-oriented evaluation, a subsequent state can thus be identified and/or selected in a step-by-step manner. The reference of the current state can then be stored in the data set of the subsequent state. As long as the end time point or end state defined by the settings used in preparation for the evaluation has not been reached, the evaluation procedure can be continued in this way.

With the aid of the work levels described above, the search procedure for the creation of a single roadmap in step 200 can proceed such that, starting from the initially established system state, which can lie within the time period of an operating state, it can first be ensured that it is calculated through the end of the operating state. In other words, the converted energy quantities and costs are first determined through the end of the current operating state, whereby the first edge is also produced in the difference graph. The adjacent vertex and the state of the technical system corresponding thereto subsequently constitute the starting point for the cyclic search process, which makes use of levels 2 to 4 described above.

Figure 5:
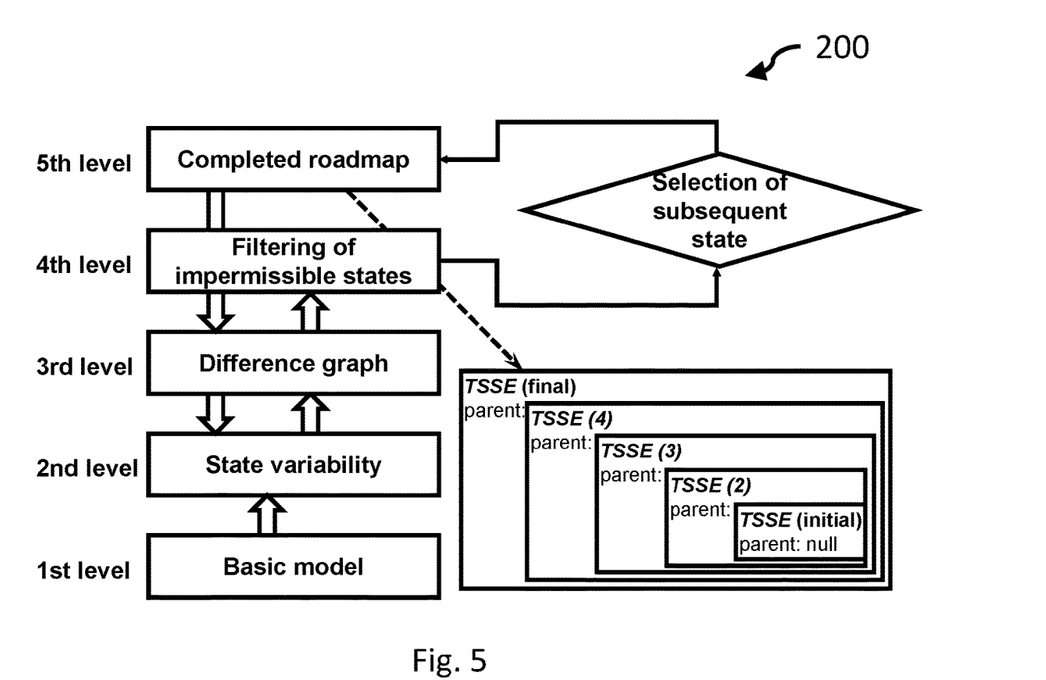
FIG. 5 shows possible modeling of evaluation levels in one embodiment of the invention.

Based on the current system state for the evaluation, the difference graph can be queried with respect to which variations of subsequent states exist for the current system state. If these have not yet been determined for the timepoint in question and the associated system state, they can be generated on request. In order to generate the subsequent states, it can first be determined with the aid of the state variability graph which changes are possible by definition in the basic model in terms of operating states and target values. The possible changes with respect to energy flows and quantities, as well as the costs and subsequent states corresponding thereto, can then be determined from this, and the latter can be represented simultaneously by new vertices in the difference graph. Before this interim result can be applied at the outcome level, the 4th level of the basic system can check and filter the validity of the possible changes. Based on the sequence of states and the current system state, the subsequent states identified by the difference graph can be checked with respect to storage states and time restrictions to be observed, so that only validated and applicable subsequent states are returned to the outcome level. After that, it can be the task of the decision-making process to establish the next system state. FIG. 5 shows a graphic representation of the context described here of the evaluation in step 200 as well as the structural configuration of a completed roadmap, with the completed roadmap then being produced in the context of its being deemed as TSSE (final) from among the provisional roadmaps identified at each of the individual levels—TSSE (initial), TSSE (2) . . . TSSE (4).

It is of course also possible to parallelize the sub-steps within step 200. In that sense, the sub-steps and levels presented merely constitute examples of a model.

The essentially possible parallelization of evaluation strategies through the execution of a plurality of evaluation threads can also be implemented for the basic step-by-step system proposed herein. In the difference graph, the simultaneous creation of vertices for a system state represented the main problem in this regard, since it can result in inconsistent or even overwritten vertices within the graph. In order to work around this problem, a locking process was developed that prevents the simultaneous creation of vertices for one and the same system state. With an appropriate synchronization in the difference graph, the simultaneous creation of state vertices can thus be prevented. At the same time, the vertex that is created can be provided with a lock that can be opened again only by the thread by means of which it was created. In such cases, other threads must wait for the state vertex and the subsequent states thereof to be processed but can then read and thus have quicker access to the corresponding information. Depending on the variability of a technical system and the corresponding size of the state space, parallelization may be advantageous in some circumstances in order to reach an outcome more quickly.

Even in the context of an individual evaluation strategy, it is possible to produce several outcomes, so that, upon conclusion of an evaluation, several alternative roadmaps are available and can continue to be used.

With the aggregation of technical systems, the model of the invention enables multiple systems to be observed at the same time. The system idea and thus the encapsulation of individual systems is used as the basis for describing a system of systems. The aggregation itself can represent a distinct system, whereas all of the subsystems to be considered can continue to be handled in the manner described above. It is thus possible to configure arbitrarily complex combinations of systems, e.g., as a tree-like structure, to use them in the individual systems in the above-described form, or to represent them by alternative or individual roadmaps. The concept of the stepwise approach to the evaluation of individual systems can be expanded and adapted for the evaluation of aggregations. In addition, network state calculations can also be performed in the context of the application of an individual evaluation strategy. Analogously to individual systems, individual strategies can be developed and used here as well.

Figure 6:
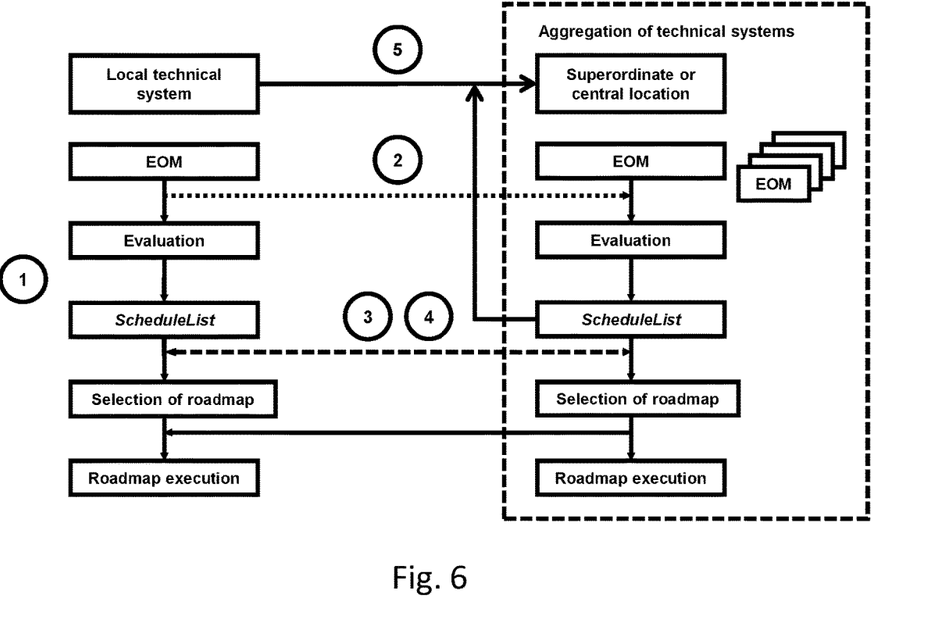
FIG. 6 shows variants of possible applications of the invention.

The structure-based possibilities for the application of the model will be outlined again briefly below. The model and the concept of the individual or alternative roadmaps can form the basis for the different types of application. FIG. 6 shows an illustration of this variant.

As pointed out previously, the structure of the underlying data model and of the framework of the model enable both individual and multiple technical systems to be described and evaluated. Decisions in relation to changes in operating states and target value configurations can be represented and applied uniformly on this basis. The decision-making processes themselves are embedded in control processes, which can be located either locally or centrally according to the described approaches. The use of the energy option model within the energy agent may represent the standard case, but other types of usage are possible. With regard to the procedural approach taken in order to move along from the defining of a technical system to an executable roadmap, the following evaluation and corresponding distributed interaction system can be implemented in principle on the basis of the model.

1. The application designated by 1 in FIG. 6 represents the use of the model in a purely local application and thus corresponds to the evaluation system for individual energy conversion processes. In this case, essentially only the left half of FIG. 6 is observed. The energy agent used on site makes use of the basic information of the model that is available and the current system state, as well as any necessary prognoses, in order to draft a roadmap that is "optimized" for a given evaluation period and to then pass it on to the process of roadmap execution. That is, communication takes place only between an energy conversion entity and the associated evaluation entity BE; for example, a consumer is optimized on the basis of local parameters.
2. Starting from an individual, decentrally located system, the associated definition of the model (EOM) is passed on to an aggregating energy agent. In addition to this, current system states are passed on to this superordinate process as needed in order to be taken into account in the context of roadmap creation. In this process, all necessary decisions are made centrally, and only the resulting roadmap is sent to the on-site process for roadmap execution.
3. In this system, the evaluation of the system is initially carried out locally. Alternative roadmaps are created here as well which are subsequently passed on to the aggregating process. During group evaluation, an alternative roadmap is selected and then returned to the local system. In the event that only a single roadmap is sent by the local process rather than alternative ones, the aggregating process can take a roadmap into account within the aggregation that is equated with a system prognosis.
4. The path denoted by 4 initially runs analogously to the procedure presented in 2, but here alternative roadmaps are sent to the local process. The decision as to which roadmap to use is left up to the local process, which hands over the selected roadmap to the roadmap execution process but also sends back the selected roadmap as a prognosis to the aggregating technical system. If no alternative roadmaps are created by the aggregation, then it can be passed on directly to the roadmap execution process.
5. The procedure denoted by the number 5 is a completely decentralized approach for controlling a plurality of energy conversion processes that can be implemented with the aid of the model of the invention. The approach can utilize a turn-based method, for example, in which each participating system performs an evaluation on the basis of an aggregation, in which case the aggregation is composed of at least one technical system and one roadmap. Here, the static roadmap describes the sum of the energy conversions of the predecessor systems, whereas the technical system represents the current system for which a roadmap is to be created. Through the use of these two descriptions within an aggregation, the necessary control decisions can be established for the current system—that is, the roadmap can be prepared. On the other hand, the new sum of energy conversions resulting from this is determined automatically and can be sent later to the subsequent system in order to continue the procedure there.

The approaches presented above for the application of the model of the invention are not intended to be exhaustive. With the aid of other variations that are conceivable for each of the abovementioned types of use, a multitude of sub-variants can be developed here.

Without limiting generality, different approaches can also coexist on an energy exchange network. In particular, it should be noted that it is also possible to integrate the invention into running systems, since systems that do not yet support the approach of the invention can also be taken into account in the system of the invention by means of measured values obtained through sensors and/or prognostic data, for example.

Besides the use for planning purposes in which a pre-defined period of time is considered in the context of the evaluation, the model is also suitable for ad hoc decision-making processes that can be applied in the area of control engineering, for example. In the context of an aggregation representing a single in-house network or a distribution network, for example, the continuously updated system states of the participating systems can be used to identify current possible courses of action for each energy conversion process. An evaluation process that is oriented toward the current time might rush ahead of the current time and pre-evaluate the possible subsequent states. Since these evaluation results are deposited into the difference graphs of the system in question, this simultaneously leads to an accelerated response time characteristic, which has enormous significance for time-critical applications.

It is one object of the invention to first describe the flexibility of a technical system and to render it useful and/or controllable in terms of a superordinate objective. The structure of the model makes it possible both to describe any energy conversion process and to take different energy carriers, such as electricity and natural gas, into account. This hybrid approach is not limited to just the representation of the existing flexibility with respect to operating states, target value variations, and resulting energy flows, but rather, by virtue of its nature, particularly supports the development of new operating and system states that do not yet exist today.

Through the fundamental separation of the control located in a technical system and a supplementary, external weighing and control process that is administered by an energy agent, for example, the invention gives rise to a new adaptive approach that is capable of performing an initial uniform description of decision-making and control structures, thus enabling the location of the actual decision-making process to be flexibilized. The starting point for controlling individual technical systems is therefore the information technology interface that is made available through the control of a system.

It is one object of the invention to enable the interrelation between this information and the corresponding energy flows to be functionally represented such that it can serve as the basis for realistic and thus reliable prognostic, monitoring, and optimization processes.

In the model of the invention, so-called system variables are defined as measured values, target control values, and user specifications that are available in the system as a description. In addition to the abovementioned types of variable, the model of the invention (EOM) also enables static data models and system variables to be defined which can be determined not directly by the technical system but rather only through external information services. As a result, static characteristic maps of systems or external weather information can be defined and used in the energy option model. All of the system variables together serve the purpose of describing the basic information as well as the input and output information that has an influence on the energy flows occurring in an energy conversion process.

What is more, additional information is gathered in relation to an individual energy conversion process or an individual technical system that is referred to in summary as the basic model of the model of the invention. This information includes, first of all, the definition of the system boundaries that connect an individual system to one or more energy networks and their associated energy carriers, as well as the possible connection variations. For example, the different connection capabilities of an electric car can thus be described (for example, see IEC 62196) or the different ways of using a system (e.g., for different programs for white-goods devices).

The modeling of the operating states of a system can be made possible by means of a directed graph. The vertices of the graph represent the individual, time-restricted operating states, whereas the directed edges describe the possible sequence of these states. The defining of minimum and maximum limits also enables the dwell time in an operating state to be limited—in order to protect a system, for example, or to take the storage state of a system into account.

Corresponding energy flows can be defined for each operating state as a function of the energy carrier-dependent network interfaces of an energy conversion process. Moreover, functions for the minimum and maximum dwell time in an operating state, among other things, can be defined, as well as possible energy flow gradients or methods of calculation that can be used to determine energy losses.

By virtue of the model of the invention, a general approach is made available which enables more detailed execution roadmaps to be created for individual systems. This is done with the aid of a so-called evaluation strategy. In preparation for the evaluation, temporal system states are first defined, which thus simultaneously define the evaluation period to be observed. Moreover, prognostic functions can be defined here in various ways for the time period being observed. For example, it is possible in this way to make weather information for the time period in question available that can be used in the context of related calculations for the determination of the quantity of current produced by a photovoltaic system.

Since the objectives in controlling a technical system can vary, the model of the invention offers an open approach here as well for the evaluation of the operational utilization of energy conversion processes. On the basis of an energy-quantity-based parameter, individual cost functions can be defined which are able to evaluate both the energy flows occurring in the system and the specific operating states of a system. It is thus possible to define evaluation variables in €/kWh or kg-$CO_2$/MWh, which can be applied in the context of the system evaluation to the specific states, performance parameters, and time periods.

Besides the use of the open interface to create a system roadmap, the model of the invention also provides a special, step-by-step procedure for generating roadmaps that can also be used in the framework of individual evaluation strategies. By reproducing the system states in a difference graph, system states and possible subsequent states for them can be represented. On this basis, control decisions can be qualified by quantifying parameters such as power and storage variables, thus providing a foundation on which control decisions can be made and simplifying them substantially. As a result of the evaluation of a single system, a more detailed completed roadmap can be made available which can represent a comprehensive description of the system states over time. Both the basic information as well as the input and output information of the system can be contained therein, as well as the resulting energy flows that can be dependent on these parameters. Storage states, energy flows, and the "costs" determined on the basis of the evaluation variables can be added to this. The completed roadmap can also constitute a serializable element, so that it can be communicated via a message exchange as needed.

With the aggregation of technical systems, the model of the invention enables the simultaneous observation of multiple technical systems which represent a grid-tied energy conversion process. The system idea and thus the encapsulation of individual systems is used as the basis for describing a system of systems. The aggregation itself can represent a distinct system, whereas all of the subsystems to be considered can continue to be handled in the manner described above. It is thus possible to configure arbitrarily complex combinations of systems as a tree-like structure, wherein individual systems in the above-described form are used or can be represented by alternative or individual roadmaps. The concept of the stepwise approach to the evaluation of individual systems can be expanded and adapted for the evaluation of aggregations. In addition, network state calculations can also be performed in the context of the application of an individual evaluation strategy. Analogously to individual systems, however, individual strategies can be developed and used here as well. The flexibility resulting from the approach in terms of the location of decision-making processes was presented by FIG. 6.

Even though emphasis was given in the foregoing to rather static examples, it is readily possible to also exchange current data between the energy conversion entities $EWE_1$, $EWE_2$ and the evaluation entity BE during ongoing operation. In particular, a provision can be made for roadmaps to also be recreated or optimized on the basis of updated data and then made available in like manner.

In order to facilitate the exchanging of data between the individual entities, i.e., between the energy conversion entities $EWE_1$, $EWE_2$ and the evaluation entity BE, and also the user interfaces UI, sensors SEN, and/or databases DB, a provision can be made that the data be exchanged in a defined structure—in an XML format, for example. In particular, techniques such as SOAP or REST can also be used for the requesting of data.

What is claimed is:

1. A distributed energy conversion system, comprising:
at least a first energy conversion entity, a second energy conversion entity, and a third energy conversion entity, with the first to third energy conversion entities being interconnected via an energy exchange network,
an evaluation entity that is able to communicate with the first to third energy conversion entities,
wherein the first energy conversion entity is acting as an energy supply element at an initial point in time and the second energy conversion entity is acting as an energy consumption element,
wherein the first energy conversion entity makes first data concerning the provision of energy available to the evaluation entity, and wherein the first data includes one or more of the following: availability period, available quantity, cost/unit of energy, amount of pollutant/unit of energy, and storage state for one or more future time periods,
wherein the second energy conversion entity makes second data concerning the consumption and/or use and/or storage of energy available to the evaluation entity, and wherein the second data includes one or more of the following: consumption period, consumed quantity, and stored quantity for two or more future time periods,
with an evaluation being subsequently performed by the evaluation entity of the first and second data that are made available in order to create a roadmap for the consumption of energy, and with the evaluation entity being a component of the first energy conversion entity and/or a component of the second energy conversion entity,
wherein at least one of the first to third energy conversion entities is insertable and removable from the distributed energy conversion system.

2. The distributed energy conversion system as set forth in claim 1, wherein influence is exercised on system-inherent parameters of the consumption and/or use and/or storage of energy of the first to third energy conversion entities.

3. The distributed energy conversion system as set forth in claim 1, wherein topological data and/or system states of the energy exchange network are also made available to the evaluation entity, in which case the topological data and/or system states are also taken into account in the evaluation.

4. The distributed energy conversion system as set forth in claim 1, wherein manual data concerning one of the first, second, or third energy conversion entities are conveyed by a user of the first, second, or third energy conversion entities to the evaluation entity, with the manual data also being taken into account in the evaluation.

5. The distributed energy conversion system as set forth in claim 1, wherein environmental data are made available to the evaluation entity.

6. The distributed energy conversion system as set forth in claim 1, wherein user data in relation to the second energy conversion entity are made available to the evaluation entity, with the user data including user specifications for one or more future time periods.

7. The distributed energy conversion system as set forth in claim 1, wherein user data in relation to the first energy conversion entity are made available to the evaluation entity, with the user data including user specifications for one or more future time periods.

8. The distributed energy conversion system as set forth in claim 1, wherein prognostic data pertaining to at least one of the first, second, or third energy conversion entities are made available to the evaluation entity, with the prognostic data including one or more of the following: energy production, storage volume for one or more future time periods.

9. The distributed energy conversion system as set forth in claim 1, wherein the evaluation entity processes data concerning a plurality of energy carriers, with the energy carriers being selected from a group which includes electrical energy, chemically stored energy, and/or thermal energy.

10. The distributed energy conversion system as set forth in claim 1, wherein the evaluation includes the evaluation entity constructing a directed graph for state variability of the distributed energy conversion system.

11. The distributed energy conversion system as set forth in claim 10, wherein vertices of the directed graph represent operating and target value states of the distributed energy conversion system, and edges of the directed graph represent possible transitions between the operating and target value states.

* * * * *